United States Patent [19]

Stecklein

[11] 4,192,622

[45] Mar. 11, 1980

[54] ARTICULATED JOINT INCLUDING BELLEVILLE SPRING SEALS MAINTAINED IN A PRESELECTED COMPRESSED STATE

[75] Inventor: Gary L. Stecklein, Dubuque, Iowa

[73] Assignee: Deere & Company, Moline, Ill.

[21] Appl. No.: 20,609

[22] Filed: Mar. 15, 1979

[51] Int. Cl.² .......................... F16C 11/00; F16D 1/12
[52] U.S. Cl. .................................... 403/146; 403/163; 403/290; 403/159
[58] Field of Search ............... 403/146, 290, 149, 379, 403/154–159, 161, 79, 163, 162, 408; 305/11; 172/742, 662, 651, 652, 456, 311, 349, 350

[56] References Cited

U.S. PATENT DOCUMENTS

| | | | |
|---|---|---|---|
| 2,531,326 | 11/1950 | DiPaolo et al. | 403/161 X |
| 2,838,331 | 6/1958 | Coleman | 403/146 |
| 3,050,346 | 8/1962 | Simpson et al. | 305/11 |
| 3,110,097 | 11/1963 | Yocum | 305/11 UX |
| 3,979,994 | 9/1976 | Collignon | 403/156 X |
| 4,004,855 | 1/1977 | Stecklein | 403/158 |
| 4,018,104 | 4/1977 | Bland et al. | 403/146 X |
| 4,096,957 | 6/1978 | Iverson et al. | 403/157 X |

*Primary Examiner*—Wayne L. Shedd

[57] ABSTRACT

A yoke-type pivot joint comprises a first member including a pair of parallel portions releasably fixed relative to each other and provided with holes which are axially aligned with each other and with a hole provided in a second member located between the parallel portions. A bushing is press fit into the hole of the second member and a pivot pin is received in the bushing and in the holes of the parallel portions. Received on the pin at opposite ends of the bushing are first and second pairs of opposed Belleville springs. One end of the pin is fixed to one of the parallel portions of the first member and a cap is fixed to the other parallel portion and is received on the other end of the pin. A cap screw extends through the cap into the pin and is operative for drawing the end of the pin against the cap and thereby effecting a predetermined compression of the springs at the ends of the bushing.

1 Claim, 1 Drawing Figure

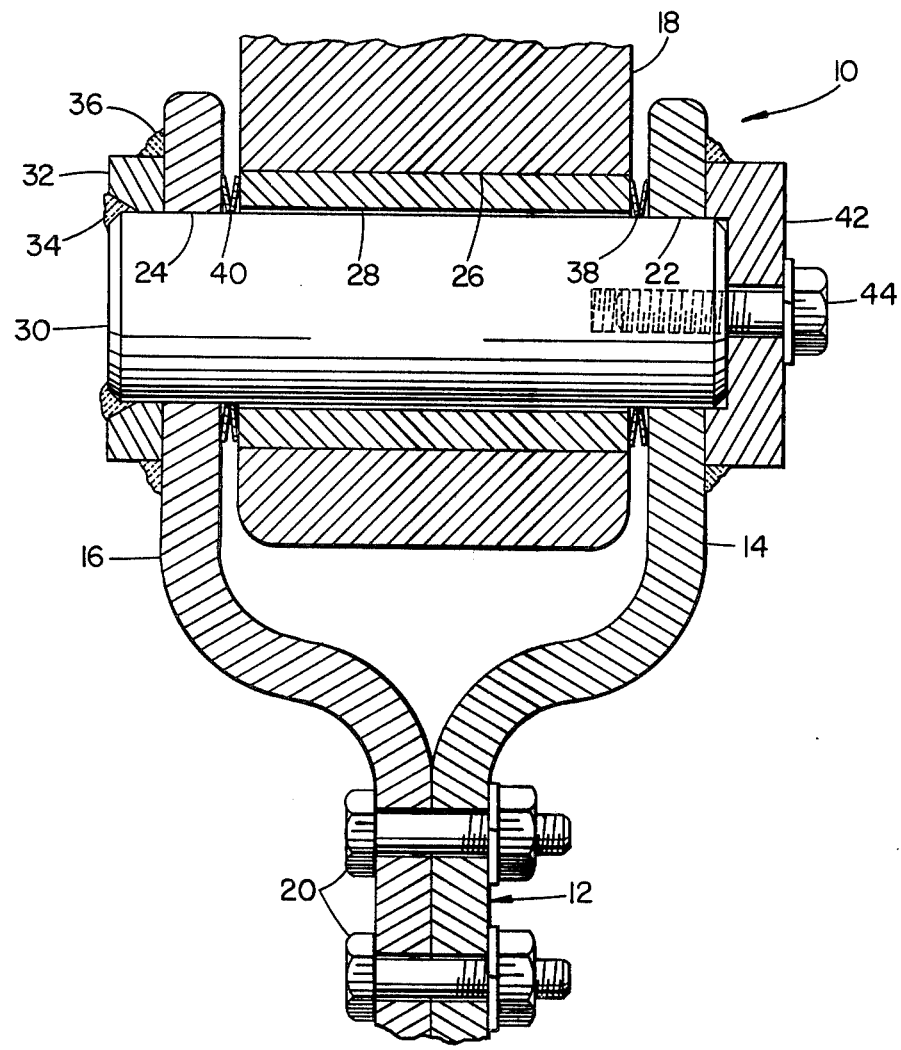

ARTICULATED JOINT INCLUDING BELLEVILLE SPRING SEALS MAINTAINED IN A PRESELECTED COMPRESSED STATE

BACKGROUND OF THE INVENTION

The present invention relates to articulated connections and more specifically relates to fixed width, yoke-type joints utilizing opposed pairs of Belleville washers as sealing means.

The use of Belleville springs as seals in fixed width, yoke-type joints has had limited use primarily because of the difficulty involved in assembling the joint while maintaining the desired amount of washer deflection.

U.S. Pat. No. 4,004,855 issued to the applicant of the instant application on Jan. 25, 1977, represents one solution to the problems of assembly and spring compression maintenance. In the patented structure, a first member includes a pair of parallel portions located on the opposite sides of a second member. The parallel portions and the second member are provided with aligned holes, and a bushing shorter than the length of the hole in the second member is received therein. Located on the pin at the opposite ends of the bushing are first and second pairs of opposed Belleville springs which, when uncompressed, have a length greater than the difference between the length of the bushing and that of the hole in the second member. A pair of adjustable width wedge assemblies are respectively mounted to the pair of parallel portions between the latter and the opposite sides of the second member for the purpose of compressing the sets of Belleville springs into the hole in the second member. The wedge pieces have the disadvantage of complicating the manufacture and thus unduly increasing the cost of the joint assemblies.

SUMMARY OF THE INVENTION

According to the present invention, there is provided a novel manner of constructing fixed width, yoke-type pivot joints including Belleville spring seals and, more specifically, there is provided simple means for maintaining the springs properly compressed for efficient sealing.

A broad object of the invention is to provide a yoke-type pivot joint including Belleville spring seals held in a compressed state by elements which are of simple construction and are easy to install.

A more specific object of the invention is to provide a joint, as described in the preceding object, wherein parallel member portions forming the outside of the pivot joint are releasably fixed for selected separation from each other and a pivot pin is fixed to one portion and insertable in a cap carried by the other portion and a cap screw is provided to draw the pin into the cap to thereby more the pair of portions to effect a preselected compression of the Belleville springs.

These and other objects will become apparent from a reading of the ensuing description together with the appended drawing.

BRIEF DESCRIPTION OF THE DRAWING

The sole FIGURE is a longitudinal sectional view of a pivot joint constructed in accordance with the principles of the present invention.

DESCRIPTION OF THE PREFERRED EMBODIMENT

Referring to the drawing, there is shown a pivot joint assembly 10 of the fixed width, yoke-type and comprising a first member 12 having a pair of parallel portions 14 and 16 defining outside portions of the yoke-type joint and a second member 18 defining an inside portion of the yoke-type joint. The parallel portion 14 is releasably joined to the remainder of the first member 12 by means of a set of bolts 20. The portions 14 and 16 are respectively provided with holes 22 and 24 which are axially aligned with each other and with a hole 26 provided in the second member 18. Press fit into the hole 26 is a bushing 28 and a pivot pin 30 is received in the bushing 28 and in the holes 22 and 24 of the parallel portions 14 and 16.

A cylindrical ring 32 is received on the left end of the pin 30 and is welded thereto, as at 34, and is welded to the portion 16, as at 36. In this way, the pin 30 is fixed to the portion 16, it being understood that a pin with a head could be substituted for the pin 30 and ring 32, the weld material 36 then fixing the head to the portion 16. Located on the pin 30 at the opposite ends of the bushing 28 are right and left pairs of opposed Belleville springs 38 and 40. A cap 42 is welded to the outer surface of the right portion 14 of the first member 12 in a location covering the hole 22. The right end of the pin 30 is received in the cap and held tight thereagainst by a cap screw 44 extending centrally through the cap 42 and threaded into the pin 30. The distance between the inner ends of the ring 32 and cap 42 is selected to effect a preselected spacing between the portions 14 and 16, when the cap screw 44 is tight, which results in the pairs of springs 38 and 40 being compressed against the bushing 28.

Thus, it will be appreciated that the ring, cap, pin and cap screw constitute simple means which are easily assembled for effecting a desired compression of the pairs of springs 38 and 40.

I claim:

1. In an articulated connection between first and second members, the first member including a pair of parallel portions disposed on opposite sides of and pivotally interconnected to the second member by a pivot pin assembly including aligned holes located in the pair of parallel portions and the second member, a bushing located in the hole of the second member and receiving a pin extending into the holes in the pair of parallel portions, and first and second pairs of opposed Belleville washers located on the pin at opposite ends of the bushing, the improvement comprising: fastening means releasably securing at least one of the pair of parallel portions in place; said pin being fixed to a first one of the pair of parallel portions; a cap disposed against an outer surface of a second one of the pair of parallel portions so as to cover the hole therein; a first end of the pin being received in the cap; and a cap screw extending through the cap and into the pin and holding the pin tight against the cap to thereby effect preselected compression of the pairs of Belleville springs between the pair of parallel portions and the opposite ends of the bushing.

* * * * *